H. G. DAYTON.
Improvement in Carbureters for Air and Gas.
No. 131,943. Patented Oct. 8, 1872.
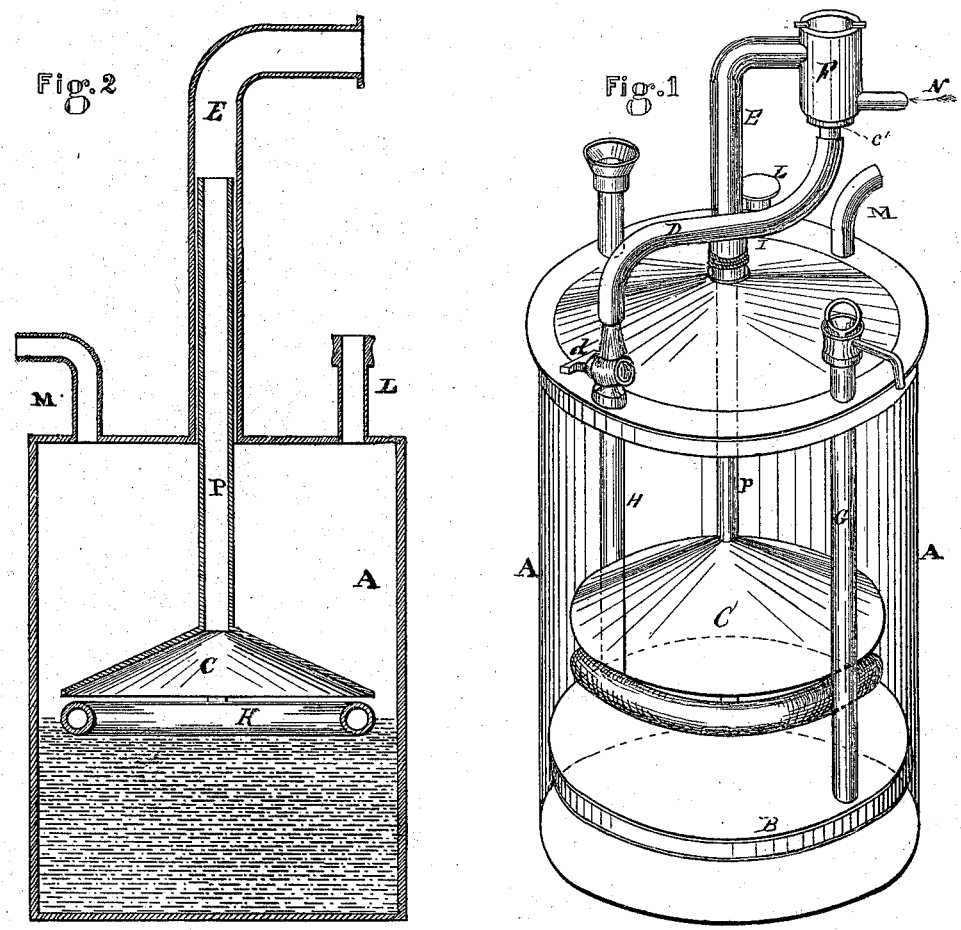

UNITED STATES PATENT OFFICE.

HENRY G. DAYTON, OF MAYSVILLE, KENTUCKY.

IMPROVEMENT IN CARBURETERS FOR AIR AND GAS.

Specification forming part of Letters Patent No. 131,943, dated October 8, 1872.

*To all whom it may concern:*

Be it known that I, HENRY G. DAYTON, of Maysville, county of Mason and State of Kentucky, have invented certain Improvements in Carbureters of Common Air, of which the following is a specification:

Before giving a detailed description of the improvements which I have invented I will refer, in general terms, to an apparatus for carbureting air which is shown and described in my Letters Patent heretofore issued, bearing date the 21st day of May, 1872. In that apparatus a vessel is placed upon the bottom to contain warm water to afford the requisite heat to the superincumbent mass of gasoline, or other hydrocarbon, contained in the main body of the apparatus; and the air which is fed to the machine, in order that it may be carbureted, is first warmed (in cold weather) by being passed through a heater, and thence conducted into the interior by a pipe which terminates in a circular disk convexed upward. The office of this disk or plate is to spread the induced current of air out evenly over the surface of the gasoline, and thus promote the process of carbureting it, and the feed-pipe before mentioned was passed down through the top of the vessel and made an air-tight joint therewith, and was rendered adjustable by a screw packing-box, to the end that the plate might be raised or lowered so as to be kept always just above the surface of the gasoline.

Now, the invention I desire to secure by this application relates to making the air feed-pipe fast into the top of the vessel containing the hydrocarbon, and providing the spreading-disk with a pipe of its own of such diameter that it will slip up and down within the supply-pipe, as the disk may rise and sink with the surface of the gasoline in the vessel; and further, in providing a hollow tube bent to conform to the outer edge of the plate or disk, and so attached thereto as to leave an annular space between them large enough to allow the carbureted air to escape freely out through it when the tube itself is partially or wholly submerged in the hydrocarbon. Thus this bent tube operates simply as a float to hold the spreader always just above the surface of the hydrocarbon automatically. It may be made solid as well as hollow, and of any suitable material.

In the accompanying drawing, Figure 1 represents a perspective view of the machine shown and described in my other before-mentioned patent, with the addition of the new improvements above described. In that figure the front half of the wall of the machine is represented as having been removed in order to display the interior parts. Fig. 2 represents a central vertical section of the body of the machine and of a portion of the supply-pipe E for the admission of the air, and of the plate or disk C with its own pipe P, and the bent tube or float K.

The improvements are so fully shown in the drawing, and so clearly described in the first part of this specification, that it is not necessary to describe them further here. In the above and foregoing description they have not been mentioned in connection with any other machine than the one shown and described in my said other patent, but it is obvious that they may be used with advantage in other like machines differing in many respects from the one I have herein shown and described.

What I claim as my invention is—

In combination with the feed-pipe E, the plate C having the pipe P and the float K, constructed substantially as and for the purpose described.

HENRY G. DAYTON.

Witnesses:
W. JAS. ROSS,
W. W. BALL.